(12) United States Patent
Van Tuyl (10) Patent No.: US 6,956,989 B2
(45) Date of Patent: *Oct. 18, 2005

(54) METHOD AND SYSTEM FOR GENERATING LOW JITTER NRZ OPTICAL DATA UTILIZING AN OPTICAL PULSE STRETCHER

(75) Inventor: Rory Lynn Van Tuyl, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/650,255

(22) Filed: Aug. 27, 2003

(65) Prior Publication Data

US 2004/0120628 A1 Jun. 24, 2004

Related U.S. Application Data

(63) Continuation-in-part of application No. 10/325,198, filed on Dec. 18, 2002.

(51) Int. Cl.[7] .......................... G02B 6/28; H04B 10/12; G02F 1/01
(52) U.S. Cl. .............................. 385/24; 385/11; 385/15; 398/189; 359/237; 359/238
(58) Field of Search ............................ 385/11, 15, 24; 359/237–244; 398/140, 141, 146, 152, 173–175, 182, 189

(56) References Cited

U.S. PATENT DOCUMENTS 6,532,091 B1 * 3/2003 Miyazaki et al. ........... 398/175

* cited by examiner

*Primary Examiner*—Michelle R. Connelly-Cushwa (57) ABSTRACT

The invention pertains to method and system for generating low jitter optical data encoded in a first format, enabling the transmission of low jitter optical data encoded in the first format. Moreover, the invention pertains to utilizing an optical pulse stretcher to convert optical data encoded in a second format to optical data encoded in the first format.

21 Claims, 8 Drawing Sheets

METHOD AND SYSTEM FOR GENERATING LOW JITTER NRZ OPTICAL DATA UTILIZING AN OPTICAL PULSE STRETCHER

CROSS REFERENCE TO RELATED APPLICATION

This patent application is a Continuation-in-Part of co-pending, commonly-owned U.S. patent application Ser. No. 10/325,198, filed on Dec. 18, 2002, entitled "OPTICAL PULSE STRETCHER FOR CONVERTING RZ OPTICAL DATA TO NRZ OPTICAL DATA FOR A LOW JITTER NRZ TRANSMITTER", by Rory Lynn Van Tuyl, which is incorporated herein by reference.

BACKGROUND OF THE INVENTION

1. Field of the Invention

The invention generally relates to optical systems. More particularly, the invention relates to using an optical pulse stretcher to convert optical data encoded in a format to optical data encoded in another format.

2. Related Art

In various practical applications, it is desirable to change the shape of an optical pulse by "stretching" it to distribute its energy over a longer time interval than that of the original optical pulse. A conventional system for stretching a pulse is depicted in prior art FIG. 1. This conventional system is also known as a split-delay-sum pulse stretcher 100.

Figure 1:
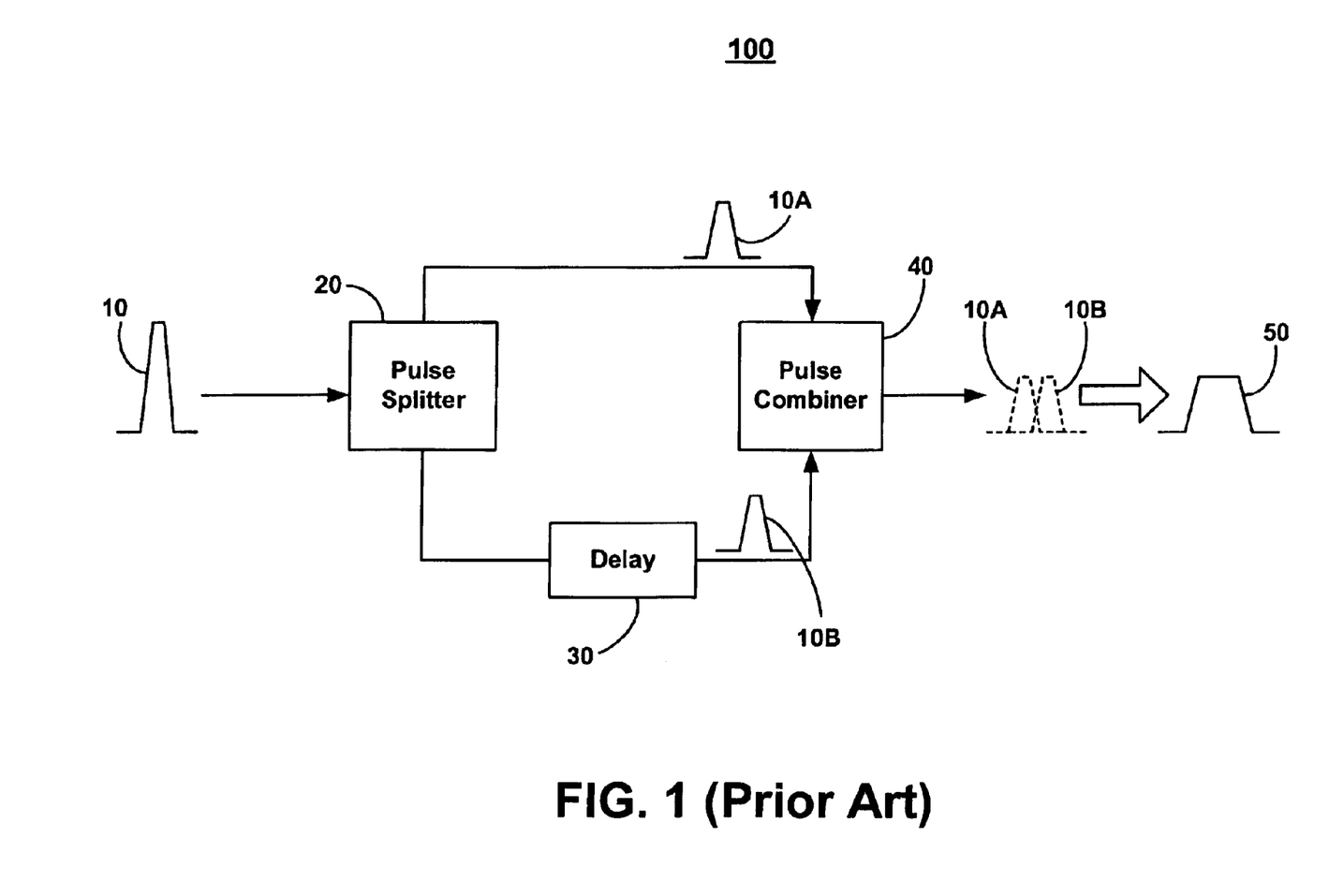
FIG. 1 illustrates a conventional system for stretching a pulse.

As shown in prior art FIG. 1, the split-delay-sum pulse stretcher 100 receives an input pulse 10. A pulse splitter 20 splits the input pulse 10 into two equal pulse portions 10A and 10B. A delay device 30 delays the pulse portion 10B with respect to the pulse portion 10A. Moreover, a pulse combiner 40 recombines the two equal pulse portions 10A and 10B, forming a stretched pulse 50 whose width (or duration) is greater than the input pulse's 10 width by the amount of the added delay from the delay device 30.

In order for the split-delay-sum pulse stretcher 100 to function properly, the pulse portions 10A and 10B must not add coherently in the pulse combiner 40. If the pulse portions 10A and 10B are baseband voltage pulses rather than optical pulses, there is no problem at the pulse combiner 40. However, if the pulse portions 10A and 10B are optical, there will be interference (destructive or constructive) between the combining pulse portions 10A and 10B if the light of the input optical pulse 10 has a coherence time greater than the delay provided by the delay device 30, or if other measures are not taken to prevent the interference. This interference can cause significant distortion of the shape of the stretched optical pulse 50. Also, in the case of coherent optical pulses, any temporal variation of the delay provided by the delay device 30 will cause temporal variation of the shape of the stretched optical pulse 50.

Moreover, optical data transmission can be impaired by jitter, which is a random or deterministic variation of the optical data stream's state transitions as compared to a reference clock. Optical data transmitters need to have low jitter, especially when they are used to measure the added jitter of tested devices or transmission systems. Methods exist for reducing transmitted jitter of electronic data streams, and for reducing transmitted jitter of RZ (return-to-zero) encoded optical data streams. In a RZ optical data stream, an optical data bit representing a logic "1" (light on) includes a logic "0" (light off) for a portion (e.g., half) of the unit interval of the bit. However, there exist no practical methods for reducing the jitter in NRZ (non-return-to-zero) encoded optical data streams. In a NRZ optical data stream, an optical data bit representing a logic "1" (light on) remains at the logic "1" state for the entire unit interval of the bit.

SUMMARY OF THE INVENTION

The invention pertains to method and system for generating low jitter optical data encoded in a first format, enabling the transmission of low jitter optical data encoded in the first format. Moreover, the invention pertains to utilizing an optical pulse stretcher to convert optical data encoded in a second format to optical data encoded in the first format.

BRIEF DESCRIPTION OF THE DRAWINGS

The accompanying drawings, which are incorporated in and form a part of this specification, illustrate embodiments of the invention and, together with the description, serve to explain the principles of the invention.

Prior art

DETAILED DESCRIPTION OF THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention.

In the description of the invention, it should be understood that "optical" applies to any form of electromagnetic signal (e.g., radio frequency, microwave, millimeter wave, infrared, visible, ultraviolet, x-ray, etc.) irrespective of the medium of propagation (e.g., free space, waveguide, transmission line, etc.). It should be further understood that "optical pulse" refers to any of the above-mentioned cases in which the intensity of the "optical" wave is modulated in such a way as to produce an increase in the intensity of the "optical" wave for the duration of the pulse.

As described above, the split-delay-sum pulse stretcher 100 of FIG. 1 has many drawbacks and deficiencies. However, an optical pulse stretcher can be designed to overcome these drawbacks and deficiencies. Moreover, this improved optical pulse stretcher is well suited to convert optical data encoded in a first format (e.g., an optical RZ (return-to-zero) format) to optical data encoded in a second format (e.g., an optical NRZ (non-return-to-zero) format). The improved optical pulse stretcher converts the optical data encoded in the first format and having a desired jitter characteristic (e.g., a low jitter level) to optical data encoded in the second format and having the desired jitter characteristic (e.g., a jitter level no greater than that of the optical data encoded in the first format). In the case of converting RZ-encoded optical data (which includes optical pulses) to NRZ-encoded optical data (which includes optical pulses), the improved optical pulse stretcher has the additional property of outputting optical pulses of duration approximately equal to one unit interval of the input RZ-encoded optical data in response to an input optical pulse of duration approximately equal to one-half of one unit interval of the input RZ-encoded optical data. Additionally, the improved optical pulse stretcher maintains or even reduces the jitter level associated with the RZ-encoded optical data when converting to the NRZ-encoded optical data.

It should be noted that the optical pulse stretcher that will be described below in FIG. 2A exhibits the properties described above. However, it should be understood that there are other implementations and configurations for the optical pulse stretcher that can exhibit the properties described above and are also suitable for converting RZ-encoded data to NRZ-encoded data, while maintaining low jitter. One example of an improved optical pulse stretcher is based on the well-known property that optical bandpass filters broaden pulses passing through them. Optical bandpass filters, because they restrict the bandwidth of any signal passing through them, limit the number of frequency components of the modulation applied to the carrier. An optical pulse is an intensity-modulated optical carrier. When the number of high frequency harmonic components of the intensity modulation waveform (the pulse envelope) is restricted by bandpass filtering, the pulse broadens, as can be shown by Fourier analysis.

Another improved optical pulse stretcher is a device based on the above-mentioned principle of split-sum-delay in which coherence problems are eliminated or reduced. One way to reduce coherence problems is to spoil the optical pulse beam's coherence by inserting a phase modulation on the beam by means of an optical phase modulator. Thus, when a split beam is recombined after having one path undergo delay with respect to the other path, the instantaneous optical phases of the two beams are different, so that coherence between the two paths is reduced and interference effects are less than with coherent beams. Another way to build an improved split-sum-delay pulse stretcher is to separate the optical pulse beam into non-interfering polarization components before recombining in a way that avoids constructive or destructive interference. For example, if the beam is separated with a polarization-selective beam splitter (a beam splitter which separates the two optical paths into orthogonal, non-interfering components), and these two paths are then recombined with a non-polarization-sensitive beam combiner in such a way that the combining beams remain orthogonal (and therefore non-interfering), the coherence problem is reduced or eliminated. It should be noted that various other implementation details might be employed to achieve the properties of an improved split-sum-delay pulse stretcher as described above.

A technique that overcomes the coherence problem associated with split-sum-delay pulse stretchers, and also offers a high degree of tolerance to environmental changes such as temperature variation, is described below and in the accompanying figures.

Figure 2A:
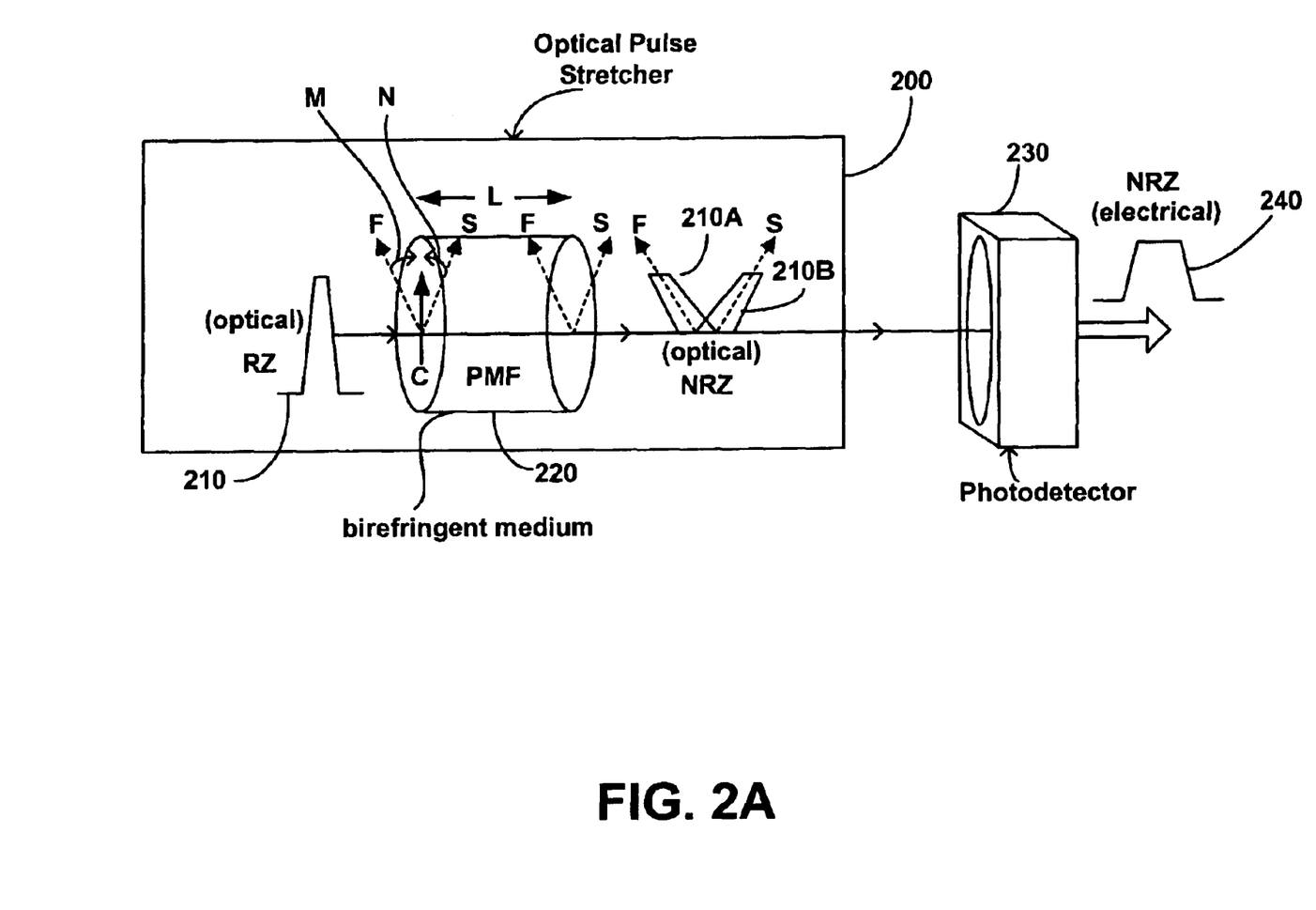
FIG. 2A illustrates an optical pulse stretcher in accordance with an embodiment of the invention, showing a photodetector coupled to the optical pulse stretcher.

FIG. 2A illustrates an optical pulse stretcher 200 in accordance with an embodiment of the invention, showing a photodetector 230 coupled to the optical pulse stretcher 200. Moreover, the optical pulse stretcher 200 performs the pulse stretching in a purely optical manner, enabling the stretching of low-jitter RZ optical pulses without having to convert these pulses to electronic form prior to stretching, a process which could introduce unwanted jitter to the stretched pulses.

As depicted in FIG. 2A, optical pulse stretcher 200 of an embodiment of the invention comprises a birefringent medium 220 having a length L. The birefringent medium 220 includes a first principal axis F (also called the fast axis) and a second principal axis S (also called the slow axis) which is orthogonal to the fast axis F. In an embodiment of the invention, an optical pulse 210 propagates along the fast axis F at a greater velocity than the velocity at which it propagates along the slow axis S. The birefringent medium 220 of an embodiment of the invention can be comprised of any of various materials. Optic fiber, birefringent quartz, and birefringent alumina are examples of materials suitable for the birefringent medium 220. In particular, these material compositions provide both a fast axis and a slow axis. In an embodiment, the birefringent medium 220 is a polarization maintaining fiber (PMF).

Figure 3A:
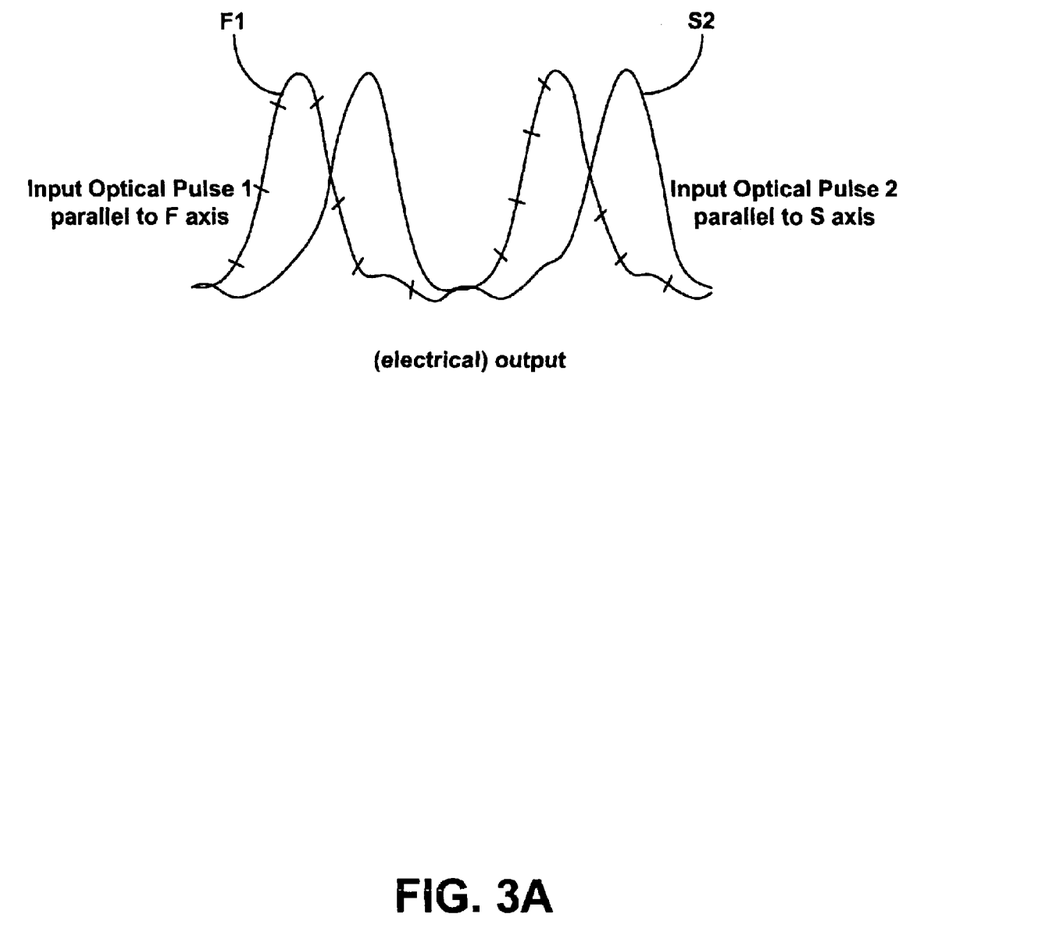
FIG. 3A illustrates a first electrical output of the photodetector of FIG. 2A in accordance with an embodiment of the invention.

If the optical pulse 210 is sent through the birefringent medium 220 with a polarization aligned with either of the principal axes F or S, the optical pulse 210 propagates through the birefringent medium 220 and emerges in the same state of polarization as it was launched. For example, FIG. 3A illustrates an electrical output F1 of the photodetector 230 when an input optical pulse1 with a polarization that is parallel to the fast axis F is sent through the birefringent medium 220. Moreover, FIG. 3A illustrates an electrical output S2 of the photodetector 230 when an input optical pulse2 with a polarization that is parallel to the slow axis S is sent through the birefringent medium 220. As expected, the electrical output S2 is delayed with respect to the electrical output F1. However, if the optical pulse 210 is launched with a linear polarization along the axis C that is not aligned with the principal axes F and S, then a portion 210A of the optical pulse 210 propagates along one of the principal axes while another portion 210B of the optical pulse 210 propagates along the other principal axis.

Figure 3B:
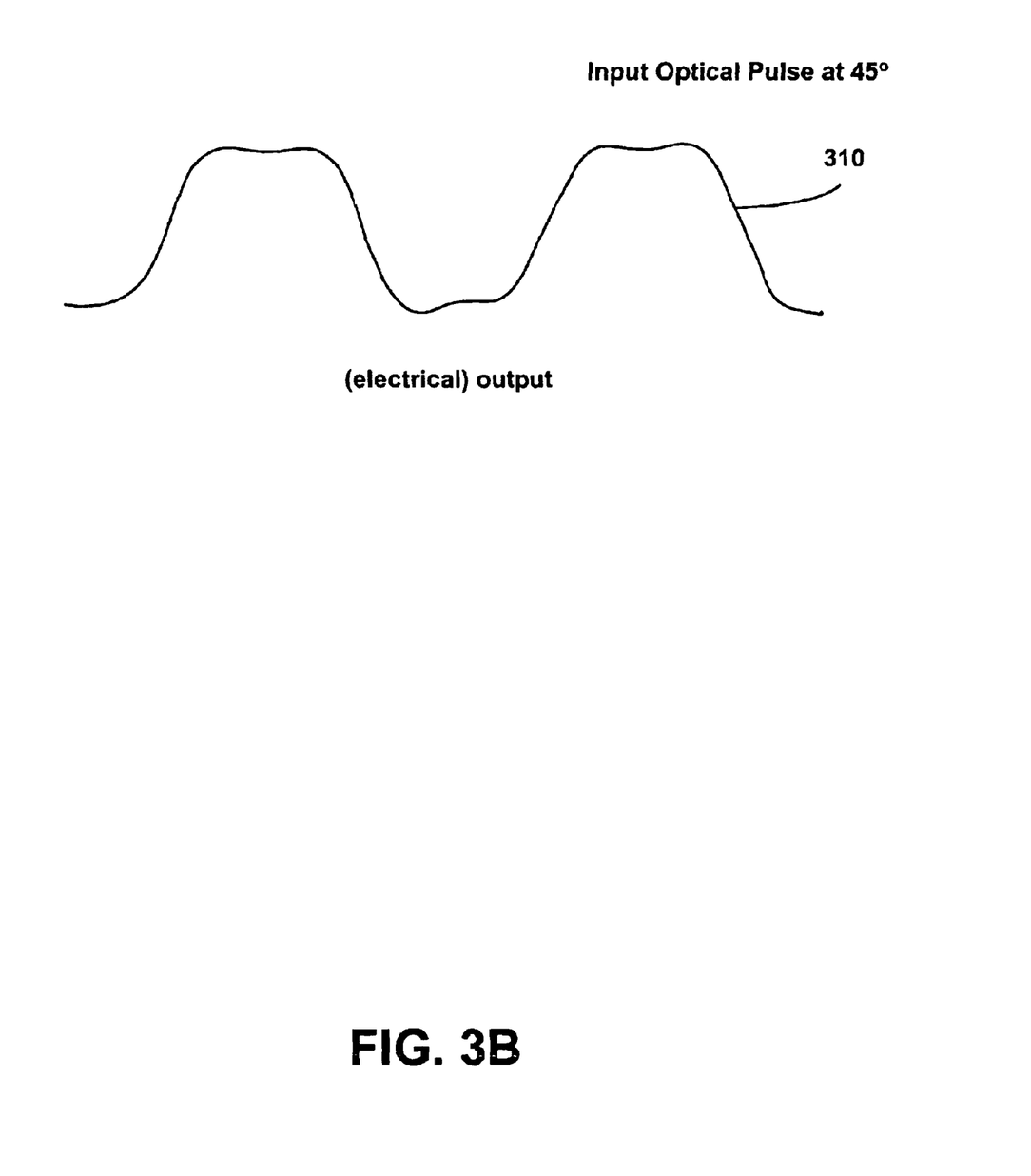
FIG. 3B illustrates a second electrical output of the photodetector of FIG. 2A in accordance with an embodiment of the invention.

The angle M is the angle between the axis C and the fast axis F. The angle N is the angle between the axis C and the slow axis S. The angles M and N determine the amount of the optical pulse 210 that travels on the fast axis F and slow axis S through the birefringent medium 220. For example, if angles M and N are 45 degrees, then equal portions of the optical pulse 210 travel along the fast axis F and slow axis S. In such instance, a pulse-type shape results when the two portions are detected at the output of the birefringent medium 220. For example, FIG. 3B depicts an electrical output 310 of the photodetector 230 when an input optical pulse with a linear polarization that is at 45 degrees to the fast axis F and the slow axis S is sent through the birefringent medium 220. The electrical output 310 has a pulse-type shape. Additionally, if angle M is greater than angle N, then a greater portion of the optical pulse 210 travels along the slow axis S. However, if angle N is greater than angle M, then a greater portion of the optical pulse 210 travels along the fast axis F.

Because of birefringence, the two portions 210A and 210B of the optical pulse 210 travel at different velocities. This results in two changes. First, the optical pulse becomes broadened or stretched because the two portions 210A and 210B of the optical pulse 210 travel the length L at different velocities, arriving at the output of the birefringent medium 220 at different times. Hence, selection of the length L can be used to produce a predetermined delay between the two portions 210A and 210B of the optical pulse 210. Secondly, the state of polarization of the optical pulse 210 becomes modified. Now, there are two orthogonally polarized optical pulses 210A and 210B at the output of the birefringent medium 220. Since the optical pulses 210A and 210B are orthogonally polarized, these optical pulses 210A and 210B would not interfere with each other in the photodetector 230, unlike the situation in the conventional split-delay-sum pulse stretcher 100 of prior art FIG. 1.

In one embodiment of the invention, the optical pulse stretcher 200, or any other optical pulse stretcher exhibiting the properties described above, is used to stretch optical pulses to convert the associated optical data from a first format to a second format. For example, a RZ optical data stream can be converted into a NRZ optical data stream using the optical pulse stretcher 200. Typically, the duration of the optical pulse in a NRZ optical data stream is approximately twice the duration of the optical pulse in a RZ optical data stream.

In particular, an optical pulse 210 of the RZ optical data stream enters the input of the birefringent medium 220 (e.g., polarization maintaining fiber (PMF) 220) with linear polarization along the axis C which is 45 degrees to the principal axes F and S of the birefringent medium 220. In an embodiment, the birefringent medium 220 is a polarization maintaining fiber (PMF) 220.

When the optical pulse 210 emerges from the PMF 220, it comprises an early optical pulse 210A, which is the component of the original optical pulse 210 that has traveled along the fast axis F, and a late optical pulse 210B, which is the component of the original optical pulse 210 that has traveled along the slow axis S. For RZ-to-NRZ conversion where the duration of the optical pulse of NRZ optical data is approximately twice the duration of the optical pulse of RZ optical data, the length L of the PMF 220 is chosen to produce a time of arrival difference between the early optical pulse 210A and the late optical pulse 210B approximately equal to the duration of the input optical pulse 210, providing a stretching factor of 2. For other cases, the length L of the PMF 220 is chosen to produce a time of arrival difference between the early optical pulse 210A and the late optical pulse 210B based on any part or multiple of the duration of the input optical pulse 210.

In practice, if a photodetector 230 is not coupled to the output of the PMF 220, the output of the PMF 220 is coupled to a low-birefringence medium such as a single mode fiber (SMF) to minimize further separation between the early optical pulse 210A and the late optical pulse 210B. When the optical pulses 210A and 210B are ultimately detected by a photodetector 230, the resulting photocurrent 240 will be identical in duration to that resulting from detection of any optical pulse of arbitrary polarization whose duration is approximately equal to twice that of the input optical pulse 210. At the output of the PMF 220, the duration of the optical pulse 210 of the RZ optical data stream has been stretched into a duration associated with the NRZ optical data stream.

The fact that the output of the PMF 220 comprises two orthogonally polarized optical pulses prevents interference between the early optical pulse 210A and the late optical pulse 210B. Polarization-insensitive photodetectors detect the early optical pulse 210A and the late optical pulse 210B without problems. It should be noted that polarization-sensitive photodetectors will not be able to correctly view the stretched optical pulse without first removing their polarization selectivity.

As described above, the optical pulse 210 is sent with a linear polarization into the input of the birefringent medium 220. A polarization controller can be used to convert any polarization to linear polarization of the proper angle. Because the optical pulses 210A and 210B travel through a single birefringent medium 220, any propagation time variations due, for example, to temperature variations, will cause a minimal variation in the time delay between fast and slow pulses 210A and 210B.

Figure 2B:
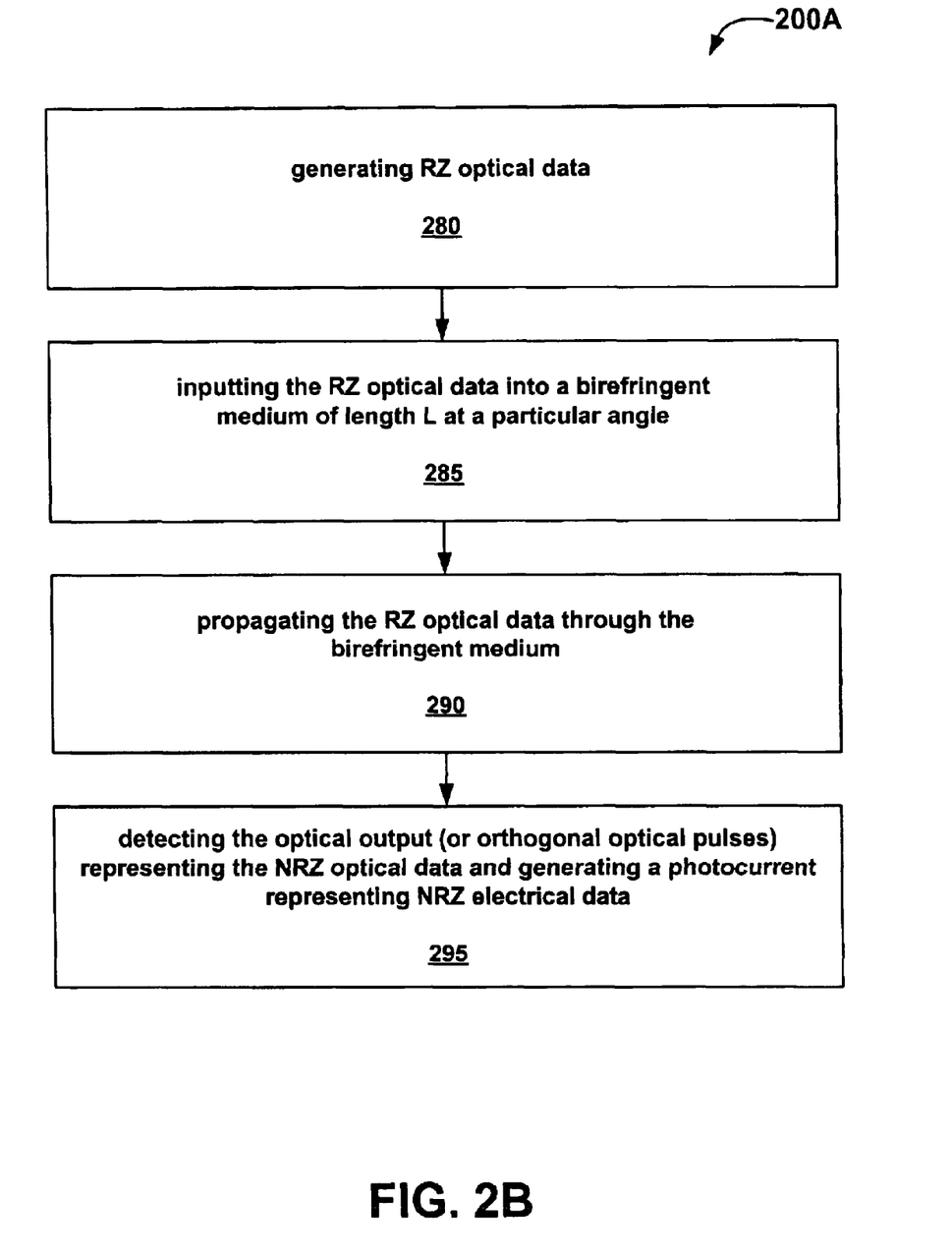
FIG. 2B illustrates a flow chart showing a method of converting optical data from a first format to a second format in accordance with an embodiment of the invention.

FIG. 2B illustrates a flow chart showing a method 200A of converting optical data from a first format to a second format in accordance with an embodiment of the invention. In an embodiment, the first format is RZ (return-to-zero) and the second format is NRZ (non-return-to-zero).

At Step 280, the RZ optical data is generated. The RZ optical data can be outputted by an optical retiming device that optically retimes the NRZ optical data using a "pulse carving" technique. This "pulse carving" technique will be described below. Moreover, the RZ optical data may have a desired jitter characteristic (e.g., a low jitter level).

Continuing at Step 285, the RZ optical data is inputted into a birefringent medium. As stated above, the birefringent medium can be comprised of any of various materials. Optic fiber, birefringent quartz, and birefringent alumina are examples of materials suitable for the birefringent medium. In an embodiment, the birefringent medium 220 is a polarization maintaining fiber (PMF). Moreover, the RZ optical data enters the input of the birefringent medium with linear polarization along an axis that is 45 degrees to the principal axes F and S of the birefringent medium. At 45 degrees, equal portions of the RZ optical data travel along the fast axis F and slow axis S, resulting in a pulse-type shape when the two portions are detected at the output of the birefringent medium. Also, the birefringent medium has a length L.

At Step 290, the RZ optical data is propagated through the length L of the birefringent medium. In one embodiment, the length L of the birefringent medium is chosen to produce a time of arrival difference between an early optical pulse of the RZ optical data and a late optical pulse of the RZ optical data approximately equal to the duration of the optical pulse of the RZ optical data, providing a stretching factor of 2. This is done because the duration of the optical pulse in a NRZ optical data stream is typically approximately twice the duration of the optical pulse in a RZ optical data stream.

Furthermore at Step 295, the optical output of the birefringent medium 220 is detected with a photodetector 230. The optical output comprises a first portion (or first orthogonal output optical pulse) of the RZ optical data that traveled along the fast axis F and a second portion (or second orthogonal output optical pulse) of the RZ optical data that traveled along the slow axis S. Moreover, the optical output has the desired jitter characteristic associated with the RZ optical data or even a lower level of jitter. The combination of these output optical pulses represents the NRZ optical data having a stretched optical pulse with respect to the optical pulse of the RZ optical data. The photodetector 230 generates a photocurrent representing NRZ electrical data, whereas the photocurrent has a shape resembling a stretched pulse with respect to the shape of the optical pulse of the RZ optical data.

Figure 4:
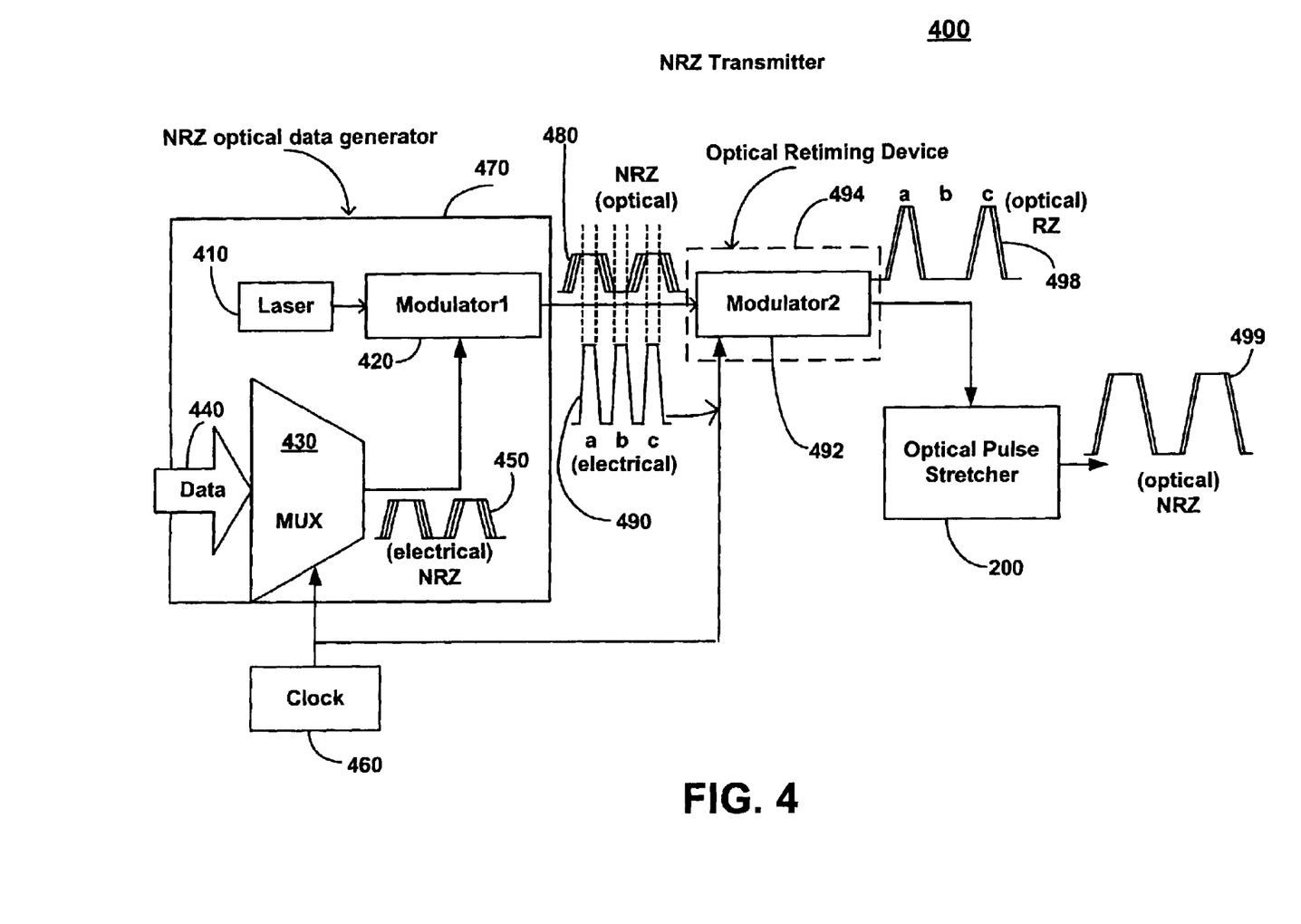
FIG. 4 illustrates a low jitter NRZ transmitter in accordance with an embodiment of the invention.

FIG. 4 illustrates a low jitter NRZ transmitter 400 in accordance with an embodiment of the invention. Many electronic circuits reduce jitter by retiming, that is, by re-synchronizing the data state transitions to a reference clock. A form of optical retiming is accomplished by pulse carving. With this method, a narrow portion of an NRZ optical data stream is "carved" by a reference clock using an optical data modulator. Since the clock driving the pulse carver is free of data-dependent jitter, the resulting RZ data pulses are largely free of data-dependent jitter. Thus, the data-dependent jitter of the NRZ optical data transitions is largely removed.

As shown in FIG. 4, the low jitter NRZ transmitter 400 comprises a NRZ optical data generator 470, a first optical medium (e.g., optical retiming device 494), and a second optical medium (e.g., optical pulse stretcher 200). In particular, the first optical medium and the second optical medium optically reduce the jitter of an optical data stream generated by the NRZ optical data generator 470, whereas the optical data stream has optical pulses. In an embodiment, the first optical medium is an optical retiming device 494 while the second optical medium is an optical pulse stretcher 200 as described above.

The optical retiming device 494 is adapted to receive an optical data stream encoded in a first format and having a first level of jitter (e.g., an undesired jitter characteristic). Moreover, the optical retiming device 494 optically reduces the jitter of the optical data stream. It also converts the format of the optical data stream encoded in the first format to a second format and having a second level of jitter (e.g., a desired jitter characteristic) that is lower than the first level of jitter. In an embodiment, the first format is an optical NRZ (non-return-to-zero) format while the second format is an optical RZ (return-to-zero) format.

The optical pulse stretcher 200 is adapted to receive the optical data stream encoded in the second format and having the desired jitter characteristic. Furthermore, the optical pulse stretcher 200 optically stretches the optical data stream to convert the format of the optical data stream encoded in the second format to the first format and having a third level of jitter (e.g., a desired jitter characteristic) which is no greater than the second level of jitter. Thus, the optical pulse stretcher 200 performs the pulse stretching in a purely optical manner, enabling the stretching of low-jitter RZ optical pulses without having to convert these optical pulses to electronic form prior to stretching, a process which could introduce unwanted jitter to the stretched optical pulses.

Within the NRZ optical data generator 470, low data rate electrical data 440 is multiplexed into a high rate electrical data stream 450 (NRZ format) by the multiplexer 430, which is synchronized by a clock 460. A light source 410, such as a laser, provides continuous light to the modulator1 420, which generates an NRZ optical data stream 480 derived from the NRZ electrical data stream 450. NRZ optical data stream 480 includes the jitter (e.g., a first level of jitter) of the NRZ electrical data stream 450 and any other jitter added by the modulator1 420.

Moreover, within the optical retiming device 494, the clock 460 drives electro-optical modulator2 492, which acts as an optical AND gate. That is, the electro-optical modulator2 492 passes light only when the NRZ optical data stream 480 and the clock signal 490 are in the logic "1" state. The resulting output optical data stream 498 includes RZ-encoded pulses a and c with reduced jitter (e.g., a second level of jitter which is lower than the first level of jitter). Then, the optical pulse stretcher 200 converts the resulting output optical data stream 498 into a NRZ optical data stream 499 as described above, whereas the NRZ optical data stream 499 includes the low jitter properties (e.g., a third level of jitter which is no larger than the second level of jitter) of the resulting output optical data stream 498.

Figure 5A:
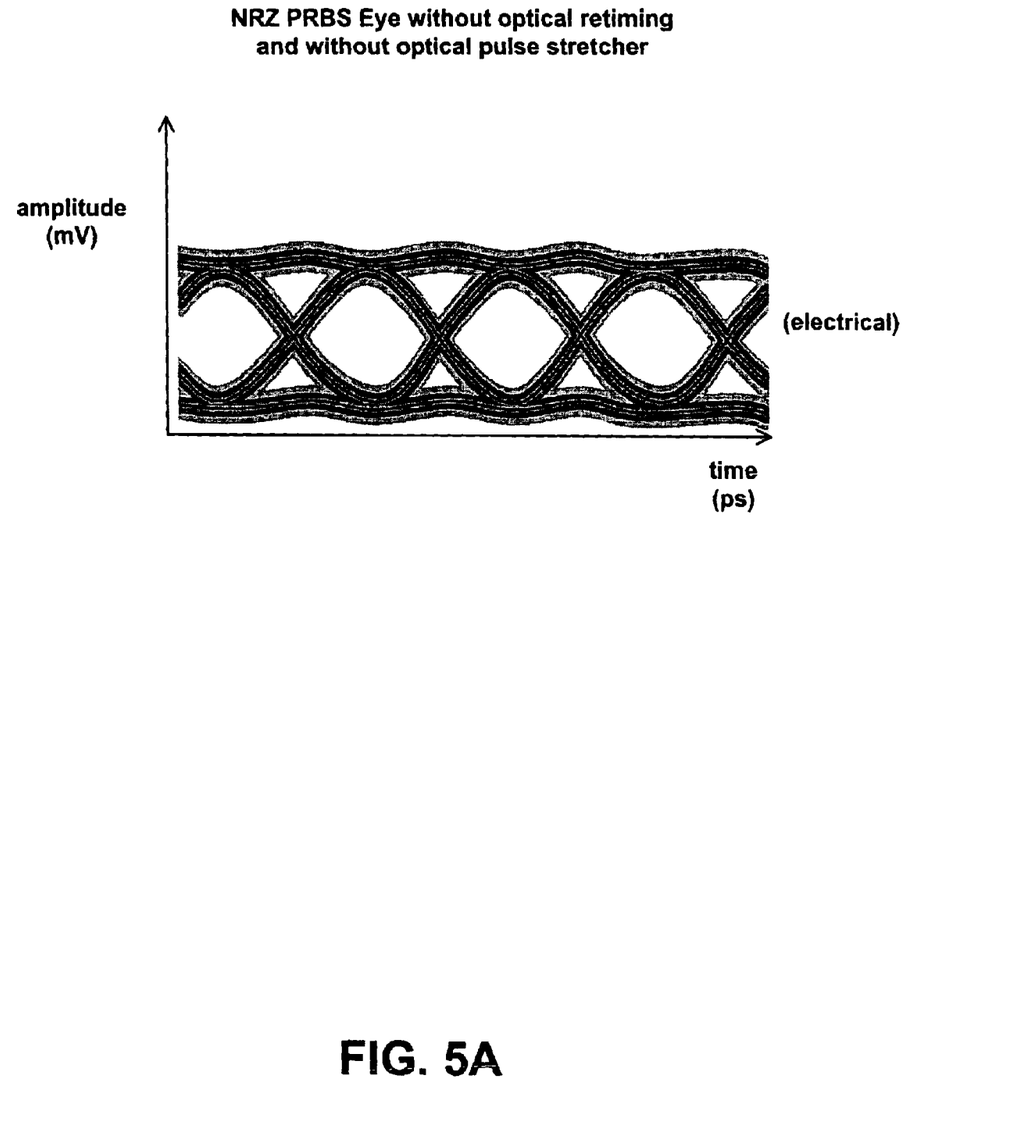
FIG. 5A illustrates NRZ formatted PRBS (pseudo-random binary sequence) eye diagram from the low jitter NRZ transmitter of FIG. 4 without optical retiming and without the optical pulse stretcher in accordance with an embodiment of the invention.
Figure 5B:
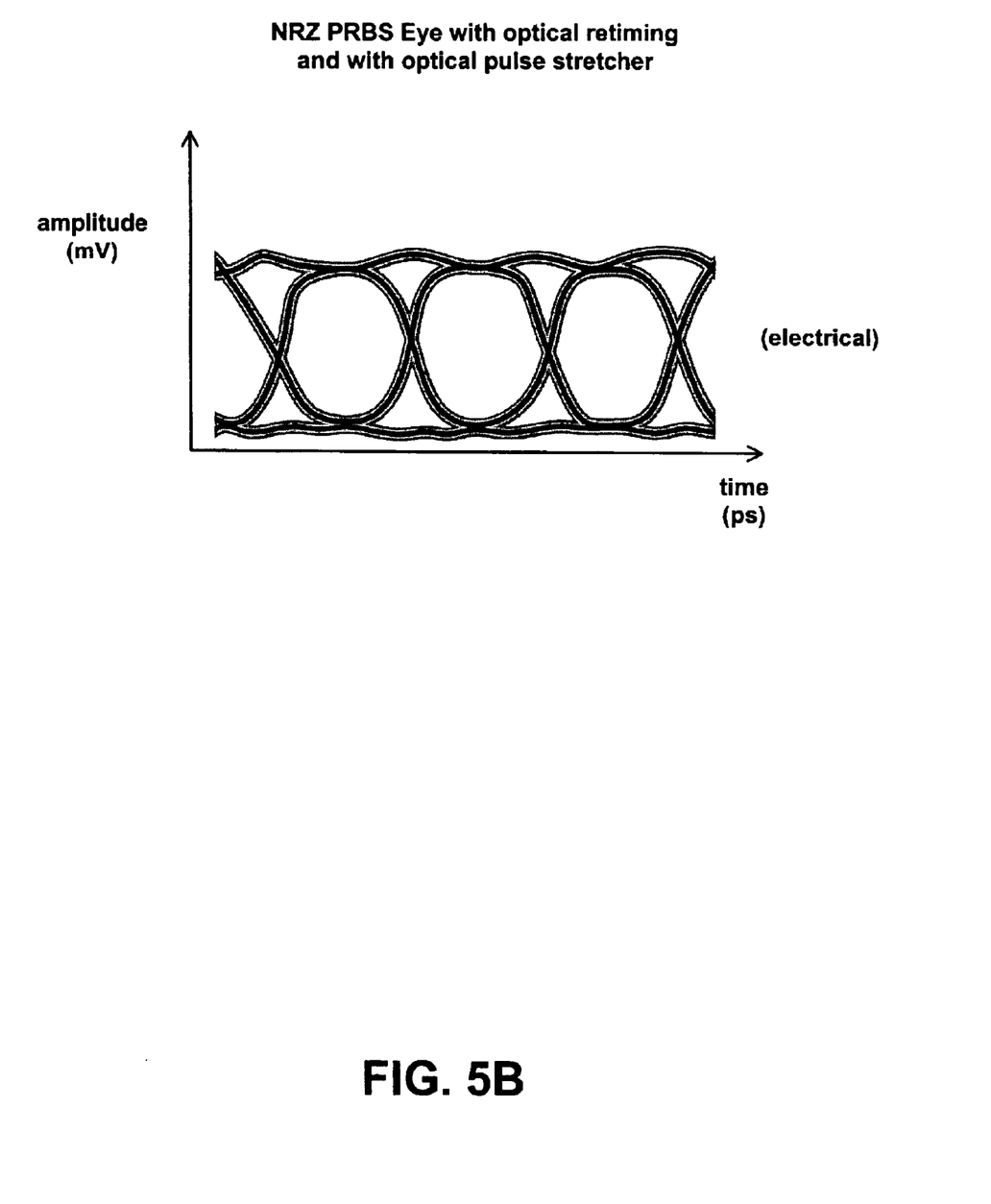
FIG. 5B illustrates NRZ formatted PRBS (pseudo-random binary sequence) eye diagram from the low jitter NRZ transmitter of FIG. 4 with optical retiming and the optical pulse stretcher in accordance with an embodiment of the invention.

FIG. 5A illustrates NRZ formatted PRBS (pseudo-random binary sequence) eye diagram from the low jitter NRZ transmitter of FIG. 4 without optical retiming and without the optical pulse stretcher in accordance with an embodiment of the invention. FIG. 5B illustrates NRZ formatted PRBS (pseudo-random binary sequence) eye diagram from the low jitter NRZ transmitter of FIG. 4 with optical retiming and the optical pulse stretcher in accordance with an embodiment of the invention. These experimental results indicate a jitter improvement of approximately 3:1 between FIGS. 5A and 5B. Although this specific jitter improvement is shown in the present example, the invention is well suited to provide other ranges of jitter improvement.

Again, it should be noted that the optical pulse stretcher 200 exhibits the properties described above for converting RZ-encoded data to NRZ-encoded data, while maintaining low jitter. However, it should be understood that there are other implementations and configurations for the optical pulse stretcher that exhibit the properties described above and would also be suitable for converting RZ-encoded data to NRZ-encoded data, while maintaining low jitter.

The foregoing descriptions of specific embodiments of the invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of generating optical data encoded in a first format, said method comprising:
   generating said optical data encoded in a second format, wherein said generating includes:
      generating a first optical data encoded in said first format, said first optical data having a first level of jitter; and
      optically retiming said first optical data to reduce jitter associated with said first optical data such that said first optical data is converted to a second optical data encoded in said second format, wherein said second optical data has a second level of jitter, and wherein said second optical data represents said optical data encoded in said second format;
   inputting, into an optical pulse stretcher, said optical data encoded in said second format;
   using said optical pulse stretcher to convert said optical data encoded in said second format to said optical data encoded in said first format; and outputting from said optical pulse stretcher said optical data encoded in said first format, wherein said optical data encoded in said first format has a third level of jitter.

2. The method as recited in claim 1 wherein said third level of jitter is no greater than said second level of jitter.

3. The method as recited in claim 1 further comprising:
transmitting said optical data encoded in said first format.

4. The method as recited in claim 1 wherein said optical pulse stretcher comprises a birefringent medium.

5. The method as recited in claim 4 wherein said birefringent medium is an optical fiber.

6. The method as recited in claim 5 wherein said optical fiber is a polarization maintaining fiber.

7. The method as recited in claim 1 wherein said first format is an optical NRZ (non-return-to-zero) format and wherein said second format is an optical RZ (return-to-zero) format.

8. A system, comprising:
an optical data generator adapted to generate a first optical data encoded in a first format, said first optical data having a first level of jitter;
an optical retiming device adapted to receive said first optical data and adapted to reduce jitter associated with said first optical data by converting said first optical data to a second optical data encoded in a second format, wherein said second optical data has a second level of jitter, and wherein said optical retiming device outputs said second optical data; and
an optical pulse stretcher adapted to receive said second optical data, adapted to convert said second optical data to a third optical data encoded in said first format, and adapted to output said third optical data encoded in said first format, and wherein said third optical data has a third level of jitter.

9. The system as recited in claim 8 wherein said third level of jitter is no greater than said second level of jitter.

10. The system as recited in claim 8 wherein said optical data generator comprises a light source, a modulator adapted to receive light from said light source, a multiplexer coupled to said modulator and adapted to provide electrical data encoded in said first format, and a clock for clocking said multiplexer.

11. The system as recited in claim 8 wherein said optical retiming device comprises a modulator driven by a clock signal such that said modulator operates as an optical AND gate on said first optical data encoded in said first format and having said first level of jitter.

12. The system as recited in claim 8 wherein said optical pulse stretcher comprises a birefringent medium.

13. The system as recited in claim 12 wherein said birefringent medium is an optical fiber.

14. The system as recited in claim 13 wherein said optical fiber is a polarization maintaining fiber.

15. The system as recited in claim 8 wherein said first format is an optical NRZ (non-return-to-zero) format and wherein said second format is an optical RZ (return-to-zero) format.

16. An optical pulse stretcher comprising:
an optical retiming device adapted to receive optical data encoded in a first format and adapted to reduce jitter associated with said optical data by converting encoding to a second format, wherein said optical data encoded in said first format has a first level of jitter, and wherein said optical data encoded in said second format has a second level of jitter;
an input for receiving said optical data encoded in said second format;
means for converting said optical data encoded in said second format to optical data encoded in said first format; and
an output for outputting said optical data encoded in said first format, wherein said optical data encoded in said first format has a third level of jitter.

17. The optical pulse stretcher as recited in claim 16 wherein said third level of jitter is no longer than said second level of jitter.

18. The optical pulse stretcher as recited in claim 16 wherein said means for converting comprises a birefringent medium.

19. The optical pulse stretcher as recited in claim 18 wherein said birefringent medium is an optical fiber.

20. The optical pulse stretcher as recited in claim 19 wherein said optical fiber is a polarization maintaining fiber.

21. The optical pulse stretcher as recited in claim 16 wherein said first format is an optical NRZ (non-return-to-zero) format and wherein said second format is an optical RZ (return-to-zero) format.

* * * * *

UNITED STATES PATENT AND TRADEMARK OFFICE
CERTIFICATE OF CORRECTION

PATENT NO. : 6,956,989 B2
DATED : October 18, 2005
INVENTOR(S) : Van Tuyl It is certified that error appears in the above-identified patent and that said Letters Patent is hereby corrected as shown below:

Column 10,
Line 32, delete "longer" and insert -- greater --.

Signed and Sealed this

Twenty-first Day of February, 2006

JON W. DUDAS
*Director of the United States Patent and Trademark Office*